June 5, 1923.

T. MOJONNIER

AGITATOR

Filed March 1, 1920

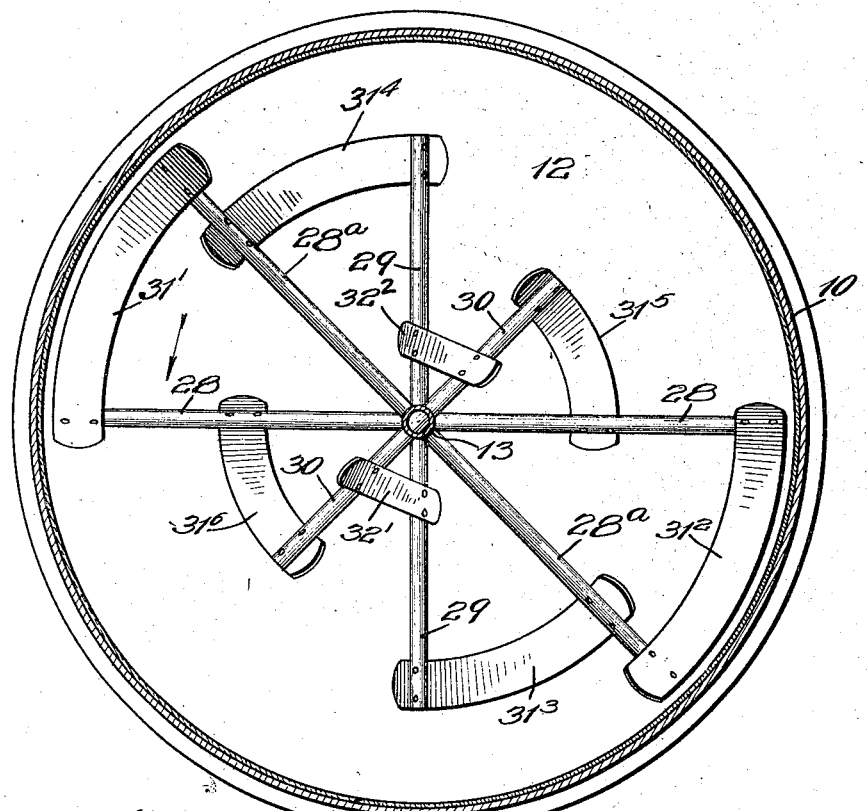
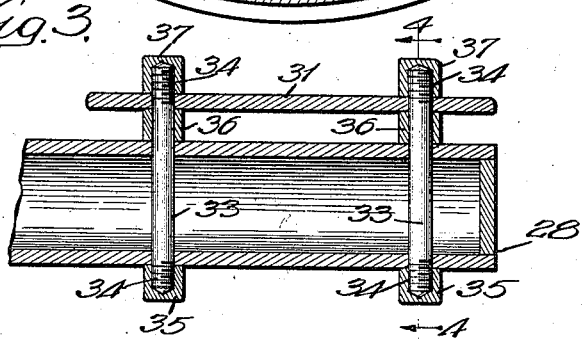
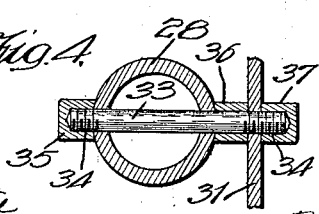

June 5, 1923.
T. MOJONNIER
AGITATOR
Filed March 1, 1920
1,457,848
3 Sheets-Sheet 3
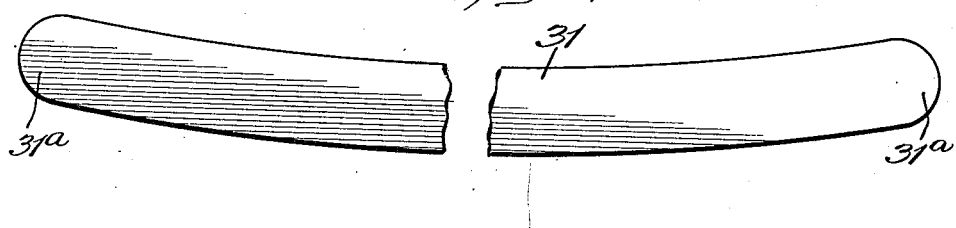
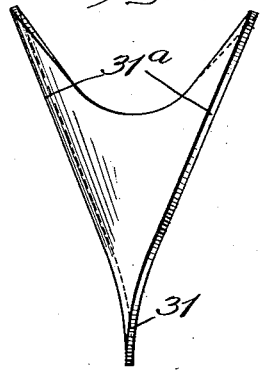
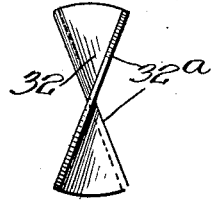
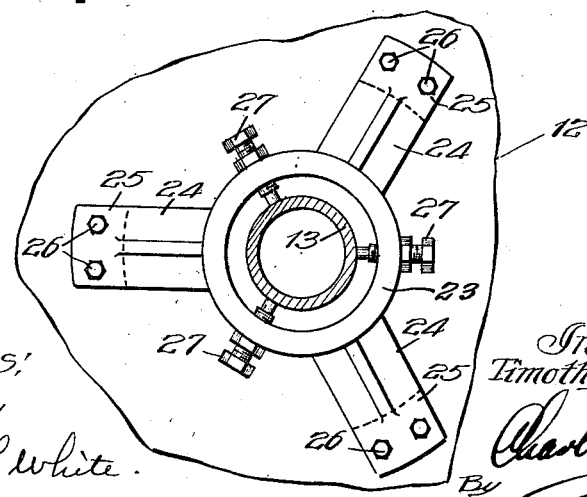
Witnesses:
W. F. Kilroy
Harry R. L. White
Inventor:
Timothy Mojonnier
By Charles S. Urban
Atty Patented June 5, 1923.

1,457,848

UNITED STATES PATENT OFFICE.

TIMOTHY MOJONNIER, OF OAK PARK, ILLINOIS, ASSIGNOR TO MOJONNIER BROS. CO., OF CHICAGO, ILLINOIS, A CORPORATION OF ILLINOIS.

AGITATOR.

Application filed March 1, 1920. Serial No. 362,403.

*To all whom it may concern:*

Be it known that I, TIMOTHY MOJONNIER, a citizen of the United States, and a resident of Oak Park, in the county of Cook and State of Illinois, have invented certain new and useful Improvements in Agitators, of which the following is a specification.

While this invention relates to agitators, especially designed to operate upon sweetened condensed milk, this agitator is also capable of an all-inclusive application particularly to liquids. Among other things it has for its objects the accomplishment of the thorough and uniform mixing of the milk or other liquid in all parts of the batch; equally efficient operation upon either small, large or intermediate batches; a complete homogeneous mixture throughout, to yield a product of the same test in all parts of the batch; the elimination of contamination to the milk or liquid; and ready access to all parts for cleaning.

With the above and other objects in view, as will be apparent, this invention consists in the construction, combination and arrangement of parts, all as hereinafter more fully described, claimed and illustrated in the accompanying drawings, wherein:—

Fig. 2 is a horizontal section taken along line 2—2 of Fig. 1 to illustrate the agitator blade arrangement;

Fig. 3 is an enlarged section along line 3—3 of Fig. 1 and illustrates the method of securing the agitator blades to the agitator arms;

Fig. 4 is a further detail of the attachment of the agitator blades, being a transverse section along line 4—4 of Fig. 3;

Fig. 5 is a plan elevation of one of the curved agitator blades;

Fig. 6 is a similar view of one of the straight agitator blades;

Fig. 7 is an end view of the type of blade illustrated in Fig. 5 and shows the lateral twist therein;

Fig. 8 is likewise an end view of the type of blade illustrated in Fig. 6 and shows the lateral twist therein; and Fig. 9 is a horizontal section taken along line 9—9 of Fig. 1 to illustrate the mounting of the agitator shaft and the means for centering it at its lower end.

Figure 1:
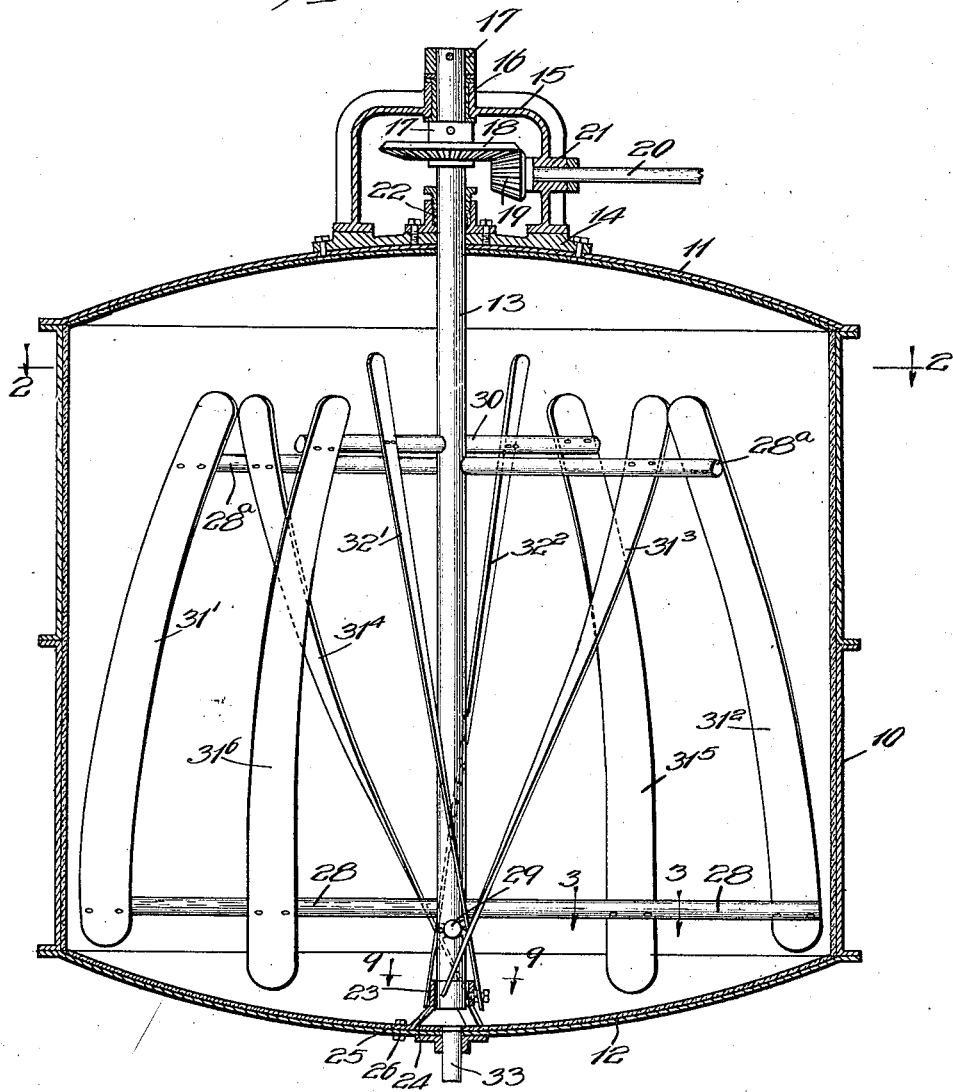
Fig. 1 is a central vertical section of an agitator constructed in accordance with the present invention; with the agitating mechanism shown in elevation.

The present agitator comprises a tank of generally greater length than diameter, set vertically and provided with a central main shaft. This main shaft projects concentrically from the upper end of the tank, where it connects with suitable driving mechanism for the rotation of the shaft and consequently the movement of the apparatus carried thereby. Carried by the main shaft are the agitator blades so arranged and constructed that, upon the rotation of the shaft, a portion of the blades carry the liquid in the tank from the top to the bottom thereof, while others carry it from the bottom to the top, and all combine in creating a circular agitation. Thus, a complete agitation, in substantially all directions, is produced.

Referring more particularly to the drawings 10 designates the tank, having in the present instance a length approximately equal to the diameter and set vertically, as illustrated. This tank 10 is provided with the top 11 and bottom 12 bulged outwardly, to produce a concentration of contents toward the tank center as the agitation ceases and the contents are withdrawn. A main shaft 13 is mounted centrally in the tank 10 and projects therefrom, through the top 11. Secured to the top 11, surrounding the projecting end of the shaft 13 is a bearing and supporting plate 14, to which is attached the bridge 15. A bearing 16 is located medially of the horizontal portion of the bridge 15, being so situated for the reception of the projecting terminal of the main shaft 13 which passes through said bearing. For the purpose of locating the shaft 13 and assisting in supporting it, a bushing 17 is fixed thereto upon each side of the bearing 16. In order to rotate the shaft 13 a bevel gear 18 is keyed thereto below the lower bushing 17 and meshes with a similar gear 19 fixed to the inner terminal of the drive shaft 20. To provide for the mounting of the drive shaft 20, the adjacent vertical portion of the bridge 15 is provided with a bearing 21 aligned with said shaft and through which the latter passes. Where the shaft 13 passes through the plate 14 and the top 11, a packing 22 is secured to said plate and embraces said shaft, said packing serving the double purpose of lubricating the shaft 13 and preventing dripping of lubricants into the tank and thus contaminating its contents.

At its lower end the shaft 13 terminates somewhat above the bottom 12, where it is embraced by the bushing 23, supported in turn by the radiating, obliquely arranged bars 24, bent outwardly as at 25 to rest flush against the bottom 12. These feet 25 of the bars 24 are secured to the bottom 12 by means of the bolts or other fastening means 26 piercing the feet 25 and the bottom 12. A series of centering or set screws 27 pierces the bushing 23, where the individual screw 27 is threaded for independent adjustment. The inner terminals of these screws 27 rest against the lower terminal of the shaft 13 thus making it possible for the adjustment of the screws to center the shaft 13 and maintain it so centered.

The agitating blades or mechanisms are attached to the shaft 13 for rotation therewith, and for this purpose the shaft 13 is provided with a plurality of radiating horizontal arms of various lengths. These arms comprise bars of varying lengths fixed in and piercing said shaft 13 and extending equidistantly upon each side of said shaft. At the lower end of the shaft 13 is a bar, creating the arms 28, 28 (said bar when referred to as a whole being likewise designated 28), of a length somewhat shorter than the diameter of the tank 10; while at the upper end of the shaft 13 is a bar creating the arms 28ª, 28ª (said bar when referred to as a whole being likewise designated 28ª), of a length equal to that of the bar 28. Thus are created two aligned arms 28 on opposite sides of the shaft 13 adjoining the bottom 12 of the tank 10, and two aligned arms 28ª on opposite sides of the shaft 13 adjoining the top 11 of the tank 10. These bars 28, 28ª do not occupy the same vertical plane but rest in vertical planes arranged at an acute angle one to the other and crossing at the shaft 13. In addition to the bars 28, 28ª at the bottom and top of the shaft 13 there are also the bars 29 and 30 at the lower and upper ends of the shaft 13 respectively. The bar 29 at the lower end of the shaft is located at right angles to the bar 28; and is shorter than the same; but is longer than the bar 30; and creates the aligned arms 29 extending equidistantly upon opposite sides of the shaft 13. The bar 30, at the upper end of the shaft is located at right angles to the bar 28ª; and is the shortest bar secured to said shaft; and creates the aligned arms 30 extending equidistantly upon opposite sides of the shaft 13. From the foregoing it becomes at once manifest that there are four blade carrying arms arranged at right angles one to the other at each end of the shaft, and that the arms at one end of the shaft occupy vertical planes located at acute angles to the vertical planes occupied by the corresponding arms at the other end of the shaft.

There are two types of agitator blades secured to the arm 28, 28ª, 29 and 30 of the shaft 13. One type is illustrated in Figs. 5 and 7, and the other in Figs. 6 and 8. The type illustrated in Figs. 5 and 7, consists of a blade 31 formed from an elongated rectangular strip of material with the rounded ends 31ª. This blade 31 is curved longitudinally to conform more or less to the curvature of the wall of the tank 10; and furthermore has a medial, lateral twist (illustrated in Fig. 7) to accommodate the different vertical planes of the arms carrying the blades so that the terminals of the blade will rest parallel throughout the width of the blade, to the arms to which it is attached. Both the curve and the twist of the blade 31, aid in the agitation and assists in producing a greater circulation in the tank.

The type illustrated in Figs. 6 and 8 consists of a blade 32 formed from an elongated, rectangular strip of material with the rounded ends 32ª. While this blade 32 is not curved longitudinally but is perfectly straight, it is given a lateral medial twist (illustrated in Fig. 8) in order that the blade may accommodate the different vertical planes of the arms carrying the blades so that the terminals of the blade will rest parallel, throughout the width of the blade, to the arms to which it is attached. As before, the twist of the blades 32 aids in the agitation and assists in producing a greater circulation in the tank.

Before taking up the arrangement of the blades 31 32 upon the arms 28, 28ª, 29 and 30, the attaching means of the individual blade will be described. This structure is disclosed in detail in Figs. 3 and 4 and as these views are based upon a section along line 3—3 of Fig. 1, the arm 28 and a blade of the type 31 is involved, though it will be understood that the attaching means is identical for all arms and blades. A pair of pins 33 threaded as at 34 at their terminals, pass through the arm 28 and project beyond the same at their ends. A cap nut 35 is fastened to one of the threaded ends of each pin 33 and at its inner ends rests adjoining the arm 28. A tubular washer 36 is mounted upon the opposite end of each pin against which rests the blade 31, the latter being provided with orifices for the reception of said pin. The threaded end 34 of the pin beyond the blade 31 has a cap nut 37 thereon tightened to bear against the blade. Thus are the various blades secured, detachably secured to their carrying arms.

Inasmuch as the action of the blades when attached to the arms varies somewhat individually, for the purposes of convenience in the description each blade, in Figs. 1 and 2, will be given a reference character (either 31 or 32) to indicate its type and in addition thereto a numerical exponent to distinguish the various individual blades of the same type. Referring now to Figs. 1 and 2, the positions of the blades will be described, at the same time it must be borne in mind that part of the blades create a circulation of the contents of the tank from the bottom to the top while the remaining blades create a circulation from the top to the bottom. Likewise it would be well to also set forth that from the shaft 13 to the wall of the tank, in other words throughout the radius of the tank, there is a circulation upwardly or downwardly or both. As the blades are arranged in pairs, upon opposite sides of the shaft 13 and as the blades of each pair follow the same path upon the rotation of said shaft, they can thus be grouped for descriptive purposes.

The first pair are blades $31^1$ and $31^2$ diametrically opposed and carried by the arms 28, $28^a$. These blades are situated for operation adjoining the walls of the tank 10 and one follows the other in a path concentric to said wall. The upper end of each blade $31^1$ and $31^2$ is secured to the terminal of one of the arms $28^a$ and the lower end of each of said blades is secured to the terminal of one of the arms 28. The direction of rotation being that of the arrow in Fig. 2, the lower ends of the blades $31^1$ and $31^2$ travel in advance of their upper ends and the blades curve, slope and twist rearwardly and upwardly from the arms 28 to the arms $28^a$ and therefore these blades in combination create a path of agitation and circulation, adjacent the wall of the tank, from the bottom 12 toward the top 11, the circulation being carried on throughout so much of the length of the blades $31^1$ and $31^2$ as the depth of the liquid in the tank makes possible.

The second pair are the blades $31^3$ and $31^4$ diametrically opposed and carried by the arms $28^a$ and 29. These blades are situated for operation adjoining the path of the blades $31^1$ and $31^2$ and one follows the other in a path concentric to the wall 10 of the tank and the path of the blades $31^1$ and $31^2$. The upper end of each blade $31^3$ and $31^4$ is secured to one of the arms $28^a$ at a point somewhat removed from the terminal thereof and the lower end of each of said blades is secured to the terminal of one of the arms 29. The direction of rotation being that of the arrow in Fig. 2, the upper ends of the blades $31^3$ and $31^4$ travel in advance of their lower ends and the blades curve, slope and twist rearwardly and downwardly from the arms $28^a$ to the arms 29 and therefore these blades in combination create a path of agitation and circulation adjacent the path of the blades $31^1$ and $31^2$, from the top 11 to the bottom 12, the circulation being carried on throughout so much of the length of the blades $31^3$ and $31^4$ as the depth of liquid in the tank 10 makes possible. It will be observed that the upper ends of the blades $31^1$, $31^2$, $31^3$ and $31^4$ adjoin but are spaced on the arms $28^a$, while the bodies of the blades $31^1$ and $31^4$ diverge as do the bodies of the blades $31^2$ and $31^3$.

The third pair consists of the blades $31^5$ and $31^6$ diametrically opposed and carried by the arms 28 and 30. These blades are situated for operation adjoining the path of the blades $31^3$ and $31^4$ and one follows the other in a path concentric to the paths of the blades $31^1$, $31^2$, $31^3$ and $31^4$ and the wall of the tank 10. The upper end of each blade $31^5$ and $31^6$ is secured to the terminal of one of the arms 30 and the lower end of each of said blades is secured to one of the arms 28 at a point midway of its length. The direction of rotation being that of the arrow in Fig. 2, the upper ends of the blades $31^5$ and $31^6$ travel in advance of their lower ends and the blades curve, slope and twist rearwardly and downwardly from the arms 30 to the arms 28 and therefore these blades create a path of agitation and circulation adjacent to the path of the blades $31^3$ and $31^4$ from the top 11 to the bottom 12, the circulation being carried on throughout so much of the length of the blades $31^5$ and $31^6$ as the depth of the liquid in the tank 10 makes possible. It will be observed that the positions of the blades $31^5$ and $31^6$ correspond to those of the blades $31^3$ and $31^4$ and consequently the direction of agitation is the same; while the lower ends of the blades $31^1$ and $31^2$ and of the blades $31^5$ and $31^6$ are secured to the arms 28 in spaced relative positions, and at the same time the bodies of the blades $31^1$ and $31^6$ diverge as do the bodies of the blades $31^5$ and $31^2$. Furthermore, it will be seen that the paths of the blades $31^1$ and $31^2$ and the blades $31^5$ and $31^6$ flank the path of the blades $31^3$ and $31^4$.

The fourth pair consists of the blades $32^1$ and $32^2$ diametrically opposed and carried by the arms 29 and 30 adjoining the shaft 13. The blades $32^1$ and $32^2$ are situated for operation adjoining the path of the blades $31^5$ and $31^6$ and one follows the other in a path concentric to the paths of the blades $31^1$, $31^2$, $31^3$, $31^4$, $31^5$, and $31^6$ and the wall of the tank 10. The upper end of each blade $32^1$ and $32^2$ is secured to one of the arms 30 midway of its length, and the lower end of each of said blades is secured to one of the arms 29 adjacent to its inner end at the shaft 13. The direction of rotation being that of the arrow in Fig. 2, the lower end of the blades $32^1$ and $32^2$ travel in advance of their upper ends, and the blades twist and slope rearwardly and upwardly from the arms 29 to the arms 30 and therefore these blades create a path of agitation and circulation adjacent the path of the blades $31^5$ and $31^6$ from the bottom 12 to the top 11, the circulation being carried on throughout so much of the length of the blades $32^1$ and $32^2$ as the depth of the liquid makes possible. It will be observed that the positions of the blades $32^1$ and $32^2$ correspond to those of the blades $31^1$ and $31^2$ and consequently the direction of agitation is the same, while the upper ends of the blades $31^6$ and $31^1$ and the blades $31^5$ and $32^2$, are secured to the arms 30 in spaced relative positions and at the same time the bodies of the blades $31^6$ and $32^1$ diverge as do the bodies of the blades $31^5$ and $32^2$. Furthermore it will be seen that the path of the blades $32^1$ and $32^2$ is the innermost of the paths of agitation.

From the foregoing it is clear that there are four separate and distinct paths of agitation, each made by two blades and all concentric one to the other and to the wall of the tank 10 and to the shaft 13. It is equally clear the number of blades may, if desired, be increased without number, being limited to some extent only by the size of the tank. Throughout the entire apparatus each of the blades leaves off where another starts, so that there is a constant agitating force operating on the mass of the liquid at all points. In the arrangement shown the two central paths of agitation and circulation (those created by the blades $31^3$, $31^4$, $31^5$ and $31^6$) are from the top 11 of the tank 10 to the bottom 12 while the extreme inner and outer paths are from the bottom 12 of the tank 10 to the top 11.

By reference to Fig. 2, it will be observed that the agitation by the blades is successive with regard to a given point in the tank 10, i. e., agitation by the blades $31^1$ is followed by that of the blades $31^4$, agitation of the blades $31^4$ by that of the blades $31^5$, and so on.

The liquid to be agitated is admitted to and taken from the tank 10 by means of the pipe 33 located centrally in the bottom 12, under the lower end of the shaft 13.

In conclusion, a complete and thorough agitation is accomplished by the present invention irrespective of the depth of the liquid in the tank, said agitation being upwardly, downwardly and laterally.

What is claimed is:

1. The combination with a tank, of an agitating mechanism therein including a first set of inclined blades extending in a general direction throughout the greater portion of the length of the tank near its outer wall and serving by their inclination to produce an outer current of the contents lengthwise of the tank in one direction, and a second set of inclined blades of substantially the same length as the first set and movable in a path just inward of and concentric and immediately adjacent to the path traversed by said first set and serving by their inclination to produce a lengthwise current in the opposite direction, the blades of the second set being located so as to alternate with the blades of the first set in passing a given point.

2. The combination with a tank, of an agitating mechanism therein comprising a series of carrying members, a first set of inclined and twisted blades extending between said members in a general direction lengthwise of the tank and near its outer wall and serving by their inclination and twist to produce lateral and lengthwise displacements of the adjacent tank contents, and a second set of inclined and twisted blades extending between said members in a general direction lengthwise of the tank and movable in a path just inward of and concentric to the path traversed by said first set and serving by their inclination and twist to produce lateral and lengthwise displacements of the adjacent tank contents in opposition to those produced by said first set, the blades of the second set being located so as to alternate with the blades of the first set in passing a given radial plane.

3. The combination with a tank, of a series of radiating carrying members therein arranged in sets at opposite ends of the tank, and a series of agitating blades interposed between the sets of carrying members, said blades being arranged in pairs, one blade of each pair to follow the other in concentric successive paths upon the rotation of the agitating mechanism.

4. The combination with a tank, of a series of radiating carrying members therein arranged in sets at opposite ends of the tank, and a series of agitating blades interposed between the sets of carrying members, said blades being arranged in pairs, one blade of each pair to follow the other upon the rotation of the agitating mechanism, and the pairs of blades being so arranged as to produce a series of concentric but opposed paths of agitation.

5. The combination with a tank, of a series of radiating carrying members arranged in sets, one set at each end of the tank, the corresponding members of said sets being out of alignment, a plurality of agitating blades interposed between certain members of said sets and positioned near the outer wall of the tank so as to travel through an outer zone, a second plurality of agitating blades interposed between other members of said sets and oppositely inclined to the blades of said first plurality, and positioned so as to travel through a zone inward of said first zone, and a third plurality of agitating blades interposed between still other members of said sets and inclined similarly to said first mentioned blades and positioned so as to travel through a zone inward of said second zone, the blades of the different zones being positioned so as to be circumferentially successive, the second blades following the first and the third following the second as they pass a given radial plane.

6. The combination with a tank, of a shaft in said tank extending lengthwise thereof, said tank having a curved wall concentric with said shaft, sets of radial carrying arms secured to said shaft, one set at each end of the tank, and two sets of agitating blades connected to and extending between said sets of carrying members, one set of blades traveling in a path adjacent to said curved wall and operative to produce a displacement of the tank contents in one direction, and the other set of blades traveling in a path just inward of the first path and operative to produce a displacement of the tank contents lengthwise of the tank in the opposite direction, the blades of the outer set being curved to conform to the curvature of the tank wall and being connected in each instance to non-aligned carrying members and being warped to conform to such connections and to provide engaging faces which are radial in all planes at right angles to said shaft, and the blades of the inner set being similarly connected to non-aligned carrying members and similarly warped to provide similar radial faces.

7. The combination with a tank, of a series of radiating carrying members therein arranged in sets at opposite ends of the tank, the corresponding members of said sets being out of alignment, and a plurality of agitating blades interposed between the members of said sets, a portion of said blades being curved, and all of said blades being twisted.

8. The combination with a tank, of a series of radiating carrying members therein arranged in sets at opposite ends of the tank, the corresponding members of said sets being out of alignment, and a plurality of agitating blades interposed between the members of said sets, a portion of said blades being laterally curved and all of said blades being twisted.

9. The combination with a tank, of a series of radiating carrying members therein arranged in sets at opposite ends of the tank, the corresponding members of said sets being out of alignment, and a plurality of agitating blades interposed between the members of said sets, a portion of said blades being laterally curved, the remainder of said blades being straight, and all of said blades being twisted.

10. The combination with a tank, of a shaft therein, an agitating mechanism carried by said shaft, means for driving said shaft located at one end thereof, a bushing at the opposite end of said tank for the reception of the shaft, arms radiating from said bushing for supporting the same, and set screws operating through the bushing and against the shaft.

11. The combination with a tank, of a shaft therein, an agitating mechanism carried by said shaft, a driving mechanism at one end of said shaft, a bushing encircling the opposite end of shaft, and means of adjustment carried by said bushing operating against said shaft.

12. The combination with a tank, of a shaft therein, an agitating mechanism carried by said shaft, a driving mechanism at one end of said shaft, a bushing encircling the opposite end of said shaft, spaced means for elevating said bushing from said tank, and an inlet and outlet pipe located under said bushing.

13. The combination with a tank, of a shaft therein, an agitating mechanism carried by said shaft, a driving mechanism at one end of said shaft, a bushing encircling the opposite end of said shaft, spaced means for elevating said bushing from said tank, and means of adjustment piercing said bushing and operating against said shaft.

14. The combination with a carrying arm, of a pair of pins piercing said arm and projecting upon both sides thereof, said pins being threaded at both ends, cap nuts upon the corresponding ends of said pins, tubular washers upon the opposite ends of said pins, a blade mounted on said pins and resting against said washers, and cap nuts holding said blade in place.

15. The combination with a carrying arm, of a number of pins removably secured to said arm, a blade attached to said pins, and means for holding said blade in spaced relation to said arm.

16. The combination with a carrying arm, of a number of pins removably secured to said arm, a blade attached to said pins, and means mounted on said pins for holding said blade in spaced parallel relation to said arm.

17. The combination with a tank, of a shaft therein, a plurality of carrying members at each end of said shaft, arranged at right angles one to the other, the carrying members at one end of the shaft being out of alignment with the carrying members at the opposite end of the shaft, and agitator blades interposed between said non-aligned carrying members at different points in their length.

18. The combination with a tank, of a shaft therein, a plurality of carrying members at each end of said shaft, arranged at right angles one to the other, the carrying members at one end of the shaft being out of alignment with the carrying members at the opposite end of the shaft, and agitator blades interposed between said non-aligned carrying members at different points in their length to create concentric paths of agitation.

19. The combination with a tank, of a shaft therein, a plurality of carrying members at each end of said shaft, arranged at right angles one to the other, the carrying members at one end of the shaft being out of alignment with the carrying members at the opposite end of the shaft, and agitator blades interposed between said non-aligned carrying members at different points in their length to create concentric and reverse paths of agitation.

20. The combination with a tank, of a shaft therein, a carrying member at each end of said shaft, said carrying members being of equal length and occupying planes at angles one to the other, another carrying member at each end of said shaft set at right angles to the first said carrying member at that end of the shaft, each of said last named carrying members being of a length different from the other and from the first said carrying members and occupying planes at an angle one to the other, and agitator blades interposed between the aforesaid carrying members.

21. The combination with a tank, of a shaft therein, a carrying member at each end of said shaft, said carrying members being of equal length and occupying planes at angles one to the other, another carrying member at each end of said shaft set at right angles to the first said carrying member at that end of the shaft, each of said last named carrying members being of a length different from the other and from the first said carrying members and occupying planes at an angle one to the other, and agitator blades interposed between the aforesaid carrying members, said blade being secured to said carrying members at different points in the length thereof.

22. The combination with a tank, of a shaft therein, a carrying member at each end of said shaft, said carrying members being of equal length and occupying planes at an acute angle one to the other, another carrying member at each end of said shaft set at right angles to the first said carrying member at that end of the shaft, each of the last said carrying members being of a length different from the other and from the first said carrying members and occupying a plane at an angle one to the other, and agitator blades interposed between the aforesaid carrying members.

23. The combination with a tank, of a shaft therein, a carrying member at each end of said shaft, said carrying members being of equal length and occupying planes at an acute angle one to the other, another carrying member at each end of said shaft set at right angles to the first said carrying member at that end of the shaft, each of the last said carrying members being of a length different from the other and from the first said carrying members and occupying a plane at an angle one to the other, and agitator blades interposed between the aforesaid carrying members, said agitator blades being secured to said carrying members at different points of the length thereof.

24. The combination with a tank, of a shaft therein, a pair of carrying members at each end of said shaft arranged at right angles one to the other and the carrying members at one end of said shaft occupying planes at acute angles to the carrying members at the opposite end of said shaft, agitator blades interposed between carrying members at one end of said shaft and the carrying members at the opposite end of said shaft, and agitator blades interposed between the carrying members of one end of said shaft and the carrying members of the other end of said shaft, agitator blades arranged in pairs interposed between the carrying members at one end of the shaft and the carrying members at the opposite end of the shaft.

25. The combination with a tank, of a shaft therein, a pair of carrying members at each end of said shaft arranged at right angles one to the other and the carrying members at one end of said shaft occupying planes at acute angles to the carrying members at the opposite end of said shaft, agitator blades interposed between carrying members at one end of said shaft and the carrying members at the opposite end of said shaft, and agitator blades interposed between the carrying members of one end of said shaft and the carrying members of the other end of said shaft, agitator blades arranged in pairs interposed between the carrying members at one end of the shaft and the carrying members at the opposite end of the shaft, each pair of agitator blades being at a different distance from said shaft than the other pairs of agitator blades.

26. The combination with a tank, of a shaft therein, a pair of carrying members at each end of said shaft arranged at right angles one to the other and the carrying members at one end of said shaft occupying planes at acute angles to the carrying members at the opposite end of said shaft, agitator blades interposed between carrying members at one end of said shaft and the carrying members at the opposite end of said shaft, and agitator blades interposed between the carrying members of one end of said shaft and the carrying members of the other end of said shaft, agitator blades arranged in pairs interposed between the carrying members at one end of the shaft and the carrying members at the opposite end of the shaft, each pair of agitator blades being at a different distance from said shaft than the other pairs of agitator blades, the agitator blades of each pair occupying planes at an angle one to the other.

TIMOTHY MOJONNIER.